(12) United States Patent
Kanj et al.

(10) Patent No.: US 12,434,622 B2
(45) Date of Patent: Oct. 7, 2025

(54) METHOD FOR CONTROLLING A LIGHT PATTERN AND AUTOMOTIVE LIGHTING DEVICE

(71) Applicant: VALEO VISION, Bobigny (FR)

(72) Inventors: Ali Kanj, Bobigny (FR); Constantin Prat, Bobigny (FR); Matthieu Drezet, Bobigny (FR); Hafid El Idrissi, Bobigny (FR)

(73) Assignee: Valeo Vision, Bobigny (FR)

( * ) Notice: Subject to any disclaimer, the term of this patent is extended or adjusted under 35 U.S.C. 154(b) by 203 days.

(21) Appl. No.: 18/552,930

(22) PCT Filed: Mar. 28, 2022

(86) PCT No.: PCT/EP2022/058178
§ 371 (c)(1),
(2) Date: Sep. 28, 2023

(87) PCT Pub. No.: WO2022/207578
PCT Pub. Date: Oct. 6, 2022

(65) Prior Publication Data
US 2024/0181956 A1 Jun. 6, 2024

(30) Foreign Application Priority Data
Mar. 29, 2021 (FR) ...................................... 2103225

(51) Int. Cl.
*B60Q 1/14* (2006.01)
*B60Q 1/16* (2006.01)
(Continued)

(52) U.S. Cl.
CPC ............... *B60Q 1/143* (2013.01); *B60Q 1/16* (2013.01); *F21S 41/153* (2018.01); *F21S 41/65* (2018.01);
(Continued)

(58) Field of Classification Search
CPC .......... B60Q 1/143; B60Q 1/16; B60Q 1/122; F21S 41/153; F21S 41/65; F21S 41/60; F21W 2107/10; F21Y 2105/16
See application file for complete search history.

(56) References Cited

U.S. PATENT DOCUMENTS 4,985,816 A 1/1991 Seko et al.
9,751,455 B2 9/2017 Nakatani
(Continued)

FOREIGN PATENT DOCUMENTS

CN 107128239 A 9/2017
DE 102017129254 A1 7/2018
(Continued)

OTHER PUBLICATIONS

European Patent Office, International Search Report and Written Opinion for corresponding International Application No. PCT/EP2022/058178 dated Jun. 27, 2022.
(Continued)

*Primary Examiner* — Abdullah A Riyami
*Assistant Examiner* — Syed M Kaiser
(74) *Attorney, Agent, or Firm* — Valeo Vision (57) ABSTRACT

A method for controlling a light pattern provided by an automotive lighting device of an automotive vehicle. The method includes providing a road profile, extracting road features from the road profile, dividing the matrix arrangement in row groups, assigning a different shifting value for each row group, each shifting value depending on the road features and dividing each row group in at least a first portion and a second portion. Each portion includes at least a boundary pixel which is in contact with the boundary pixel of an adjacent portion. The method further includes modifying the width of the first portion and the width of the second portion by shifting the position of the boundary pixels in each row group according to the corresponding shifting value and interpolating the luminous intensity values of the pixels belonging to the first and second portion.

15 Claims, 4 Drawing Sheets

(51) Int. Cl.
  *F21S 41/153* (2018.01)
  *F21S 41/65* (2018.01)
  *F21W 107/10* (2018.01)
  *F21Y 105/16* (2016.01)

(52) U.S. Cl.
  CPC ...... *F21W 2107/10* (2018.01); *F21Y 2105/16* (2016.08)

(56) References Cited

U.S. PATENT DOCUMENTS

| | | | |
|---|---|---|---|
| 10,293,740 B2 | 5/2019 | Langkabel et al. | |
| 11,092,303 B2 | 8/2021 | Park et al. | |
| 2011/0080753 A1* | 4/2011 | Hering | F21S 41/153 362/545 |
| 2020/0182431 A1* | 6/2020 | Albou | F21S 41/43 |

FOREIGN PATENT DOCUMENTS

| | | | | |
|---|---|---|---|---|
| EP | 3670263 A1 | | 6/2020 | |
| JP | 2016215692 A | | 12/2016 | |
| JP | 2017517861 A | * | 6/2017 | ............ F21K 9/278 |
| JP | 2020189608 A | * | 11/2020 | ............ F21S 41/153 |
| JP | 2020191268 A | * | 11/2020 | ............ F21S 41/255 |
| JP | 2020192823 A | | 12/2020 | |
| WO | WO-2017214648 A1 | * | 12/2017 | ............ F21S 41/675 |
| WO | 2021170509 A1 | | 2/2020 | |

OTHER PUBLICATIONS

Japan Patent Office, Office Action (including English translation) for corresponding Japanese Patent Application No. JP 2023-560194 dated Oct. 18, 2024.

Japan Patent Office, Search Report (including English translation) for corresponding Japanese Patent Application No. JP 2023-560194 dated Oct. 18, 2024.

* cited by examiner

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 4 | 8 | 8 | 8 | 8 | 7 | 5 | 3 | 1 | 0 |
| 0 | 0 | 0 | 0 | 0 | 4 | 8 | 8 | 8 | 8 | 8 | 8 | 6 | 4 | 2 | 1 |
| 1 | 3 | 5 | 7 | 8 | 8 | 8 | 8 | 8 | 8 | 7 | 5 | 3 | 1 | 0 |
| 0 | 1 | 3 | 5 | 6 | 6 | 6 | 6 | 6 | 6 | 6 | 5 | 3 | 1 | 0 | 0 |

| 0 |   | 0 | 0 |   |   |   |   |   |   |   |   |   |   | 0 |
|---|---|---|---|---|---|---|---|---|---|---|---|---|---|---|
| 0 |   |   | 8 | 8 |   |   |   |   |   |   |   |   |   | 0 |
| 0 |   |   |   | 8 | 8 |   |   |   |   |   |   |   |   | 1 |
| 1 |   |   |   |   | 8 | 8 |   |   |   |   |   |   |   | 0 |
| 0 |   |   |   |   |   | 6 | 6 |   |   |   |   |   |   | 0 |

Fig. 5

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 6 | 8 | 8 | 8 | 8 | 8 | 7 | 5 | 4 | 3 | 2 | 1 | 0 |
| 0 | 0 | 0 | 5 | 8 | 8 | 8 | 8 | 8 | 8 | 7 | 6 | 4 | 3 | 1 | 0 |
| 1 | 4 | 7 | 8 | 8 | 8 | 8 | 8 | 8 | 8 | 7 | 5 | 4 | 2 | 1 | 0 |
| 0 | 2 | 4 | 6 | 6 | 6 | 6 | 6 | 6 | 6 | 5 | 4 | 2 | 1 | 0 | 0 |

METHOD FOR CONTROLLING A LIGHT PATTERN AND AUTOMOTIVE LIGHTING DEVICE

TECHNICAL FIELD

This invention is related to the field of automotive lighting devices, and more particularly, to the way light patterns are managed when using a Dynamic Bending Light (DBL) functionality.

BACKGROUND OF THE INVENTION

Dynamic Bending Lights are increasingly present in current automotive lighting devices, becoming an upgrade to standard headlights and designed to make driving at night easier and safer.

To implement such a lighting functionality, there have been many solutions intended to provide a light pattern in the direction of the movement of the vehicle when it is entering a curve.

Mechanic-based solutions turn the lighting source as the steering wheel does, by means of an angular movement converter which directly uses the turning of the steering wheel to induce a turning in the lighting source. The lights will turn in whatever direction the wheel does, and this range of motion allows the lights to illuminate the road even when taking sharp turns or turning quickly.

This solution has received a huge number of improvements, so that the turning of the light source is more effective and also takes into account different driving circumstances.

BRIEF SUMMARY OF THE INVENTION

An alternative solution for this problem is sought.

The invention provides an alternative solution for this problem by a method for controlling a light pattern provided by an automotive lighting device of an automotive vehicle, wherein the light pattern is provided by a matrix arrangement of light pixels, the method comprising the steps of
providing a road profile;
extracting road features from the road profile,
dividing the matrix arrangement in row groups;
assigning a different shifting value for each row group, each shifting value depending on the road features;
dividing each row group in at least a first portion and a second portion, wherein each portion comprises at least a boundary pixel which is in contact with the boundary pixel of an adjacent portion; and
modifying the width of the first portion and the width of the second portion by shifting the position of the boundary pixels in each row group according to the corresponding shifting value and interpolating the luminous intensity values of the pixels belonging to the first and second portion, wherein the boundary pixels that were adjacent before the shifting remain adjacent after the shifting.

This method provides a controlled light pattern which includes a Dynamic Bending Light functionality, provided by the same lighting device that provides, for example, the low beam functionality, without moving parts and also being able to adapt to other driving circumstances, such as the driving speed or the presence of cars in the opposite direction.

The main advantage is that the lighting is more focused on the road than in other general approaches, which rely on the position of the steering wheel. In this case, the road profile is provided by other means, so that the method may achieve a predictive behaviour, thus improving the visibility of the road with time enough to react.

In some particular embodiments,
each of the first and the second portion comprises an end pixel which is opposite to the corresponding boundary pixel and is not shifted during the shifting step, and
the step of interpolating the luminous intensity values is performed by considering the luminous intensity values of the original width between the corresponding end pixel and the corresponding boundary pixel and interpolating new values for the new width of each portion.

These particular embodiments comprise a particular example of such an interpolation, which may be clarified with a more complex example. If a light row is provided containing the values 0-10-25-40-80-80-70-60-50-40-20-0, and is divided into two portions 0-10-25-40-80 and 80-70-60-50-40-20-0, the first portion will have a boundary value of 80 (the value of the boundary pixel) and an end value of 0 (the value of the end pixel, which is opposite to the boundary pixel) and the second portion will have a boundary value of 80 (the value of the boundary pixel) and an end value of 0 (the value of the end pixel, which is opposite to the boundary pixel).

If the shifting step comprises, e.g., 2 pixels to the right, the result in the first portion will be 0-x-x-x-x-x-80 (since the end value and the boundary value preserves its luminous intensity value, but now the portion includes two more pixels) and the result in the second portion will be 80-x-x-x-0 (since the end value and the boundary value preserves its luminous intensity value, but now the portion includes two less pixels).

In some particular embodiments, the interpolation of the new values is made by a bilinear method or a nearest neighbor method.

The bilinear method considers a first set of values with a first width and a final width, where this set of values should be converted to. The first width is defined by a first number of pixels (N1) and the final width is defined by a final number of pixels (N2), which can be higher or lower than the first number of pixels. A virtual abscissa segment [0, 1] is divided into N1-1 intervals, according to the first number of pixels. The ordinate values for the abscissa values are the values of the first set of values. Since they are discrete values, linear interpolations between vertices are provided. Then the same virtual interval is divided into N2-1 intervals, thus providing different abscissa values, but all of them also contained between 0 and 1. Since the first set of values defined a continuous function (due to the linear interpolation between vertices), the final abscissa values will find a correspondent value in the continuous function. These values will be the values of the final set of data. For example, the first set of values is (1 3 4 8 10), so the first width is 5, since there are 5 values. The final width is 9. The virtual segment [0, 1] is divided into N1-1=4 intervals with values 0, 0.25, 0.5, 0.75, 1. A function is defined by the vertices defined by the following pairs abscissa-ordinate: (0, 1), (0.25, 3), (0.5, 4), (0.75, 8), (1, 10). Linear interpolations are established between vertices. Now, for the final set of values, the interval is divided into N2-1=8 intervals with values 0, 0.125, 0.25, 0.375, 0.5, 0.625, 0.75, 0.875, 1. The function values for these abscissa values are located, which will be (11.5 3 3.5 4 6 8 9 10), so these will be the values of the final set of data.

The method of nearest neighbor considers a first width and a final width and it finds the ratio between first width and final width. Then a normalizing set of values are obtained by dividing the numbers of the final width by the calculated ratio. Finally, for each normalized value of the normalized set of values, the least integer greater or equal value (e.g. ceil function) is calculated, thus obtaining a set of index values. These are the index values in the first vector leading to interpolation. For example: if the first vector is [10 2 9], and should be interpolated into a vector of width of 6. The ratio is 6/3=2. The normalized set of values will be (1/2, 2/2, 3/2, 4/2, 5/2, 6/2=0.5, 1, 1.5, 2, 2.5, 3). Performing ceil function, we obtain the index set of values ceil[(0.5, 1, 1.5, 2, 2.5, 3)]=1, 1, 2, 2, 3, 3. The interpolated vector is then represented by [first_vector(1) first_vector(1) first_vector(2) first_vector(2) first_vector(3) first_vector(3)] which would be [10 10 2 2 9 9].

In some particular embodiments, the light pattern is divided into two portions and the division is performed so half of the light columns belong to the first portion and the other half to the second portion.

This is particularly advantageous in symmetric light patterns, where the two portions are symmetric with respect to the boundary columns.

In some particular embodiments, the light pixels are provided by solid-state light sources.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

In some particular embodiments, each row group corresponds to only one row of the matrix arrangement of light pixels.

A finer tuning of the final light pattern is achieved when the number of row groups is higher, i.e., when each row group contains the minimum possible number of rows.

In some particular embodiments, the method further comprises the step of applying a final mask configured to avoid glaring, which comprises dimming or turning off some of the shifted light pixels.

In these embodiments, the correction is not aimed to compensate the total flux, or to improve the homogeneity to the final beam, but to avoid glaring other vehicles. When rows are shifted, there is a possibility that the final light pattern projects some light on an opposite lane. A final mask to dim or turn off these pixels projecting light on the opposite lane is advantageous to avoid glaring.

In some particular embodiments, the road features are road points, each road point being characterized by a distance from the lighting device and an angle from the lighting device, and the shifting values are calculated using the distance and angle of the road points.

A simple way of implementing this invention is to capture a plurality of road points, and then calculating each shifting value using the position of these points, so that the shape of the road has a direct impact on the shifting pattern of the light pattern.

In some particular embodiments, each shifting value is calculated using the distance and angle of at least one road point.

An optimal way of achieving this transformation is assigning one road point to each row group. Since each row group is characterized by a distance between the lighting device and the light projected by this row group, the road point corresponding to this distance will provide an angle value. This angle value may be directly converted into a number of shifting positions for this row group.

The matrix of solid-state light sources may have many different angular resolutions. Depending on the number and arrangement of these light sources, resolution may vary from 0.01° per light source up to 0.5° per light source. Hence, the angle value of the road point may be translated in a different number of columns of the light array, depending on the density of these light sources in the array arrangement.

In some particular embodiments, the method further comprises the step of compensating the luminous intensity of some of the light pixels of the modified light pattern, thus obtaining a compensated light pattern such that the luminous flux of the compensated light pattern is equal to the luminous flux of the original light pattern.

In some light patterns, where the homogeneity of the beam is not enough to compensate the change in the light provided by the matrix arrangement, the intensity of some of the light sources may need to be corrected.

In some particular embodiments, the step of compensating the luminous intensity comprises multiplying the luminous intensity of at least some of the light pixels of the modified light pattern by a compensation factor.

This compensation factor is intended to compensate the total flux of the modified light pattern, so that the energy consumption and temperature of the light sources remains under control. For example, in some particular embodiments, wherein the compensation factor is a global compensation factor which is applied to all of the pixels of the modified light pattern and is calculated from the total luminous flux of the original light pattern and the total luminous flux of the modified light pattern according to the formula $$g=1+(f1-f0)/f0,$$

wherein g is the global compensation factor, f1 is the total luminous flux of the modified light pattern and f0 is the total luminous flux of the original light pattern.

In some particular embodiments, the original light pattern is a low beam pattern comprising a kink zone and the compensation factor is not applied to the light pixels of the kink zone. In other embodiments, the original light pattern is a high beam pattern comprising a maximum luminous intensity pixel and the compensation factor is not applied to the maximum luminous intensity pixel.

The cut-off or kink is a diagonal line of the low beam pattern, and its shape is important in automotive regulations. The fact that this kink belongs to the central portion means that this kink is being shifted when a bend is approaching. This is advantageous since the shifted pattern must also comply with the regulations.

These two cases are relevant examples of zones that do not need to be compensated. The compensation may be performed in the rest of the light pixels, so that these singular zones remain without compensation, so that automotive regulations may be met.

In some particular embodiments, the step of providing a road profile is carried out by using images of a camera. In some particular embodiments, the step of providing a road profile is carried out by using a global positioning system.

A camera is useful to provide the road profile, and a global positioning system is also helpful to complete the information provided by the camera.

In some particular embodiments, the light pixels of the image pattern are grey scale pixels, and more particularly, the luminous intensity of each pixel is according to a scale from 0 to 255.

Light modules usually define the light pattern on a grey scale, where the luminous intensity is graded from 0 to 255. This is a way of quantifying the light pattern so that it becomes able to be converted into light data, and then transmitted and managed by the control unit of the vehicle.

In a further inventive aspect, the invention provides an automotive lighting device comprising
  a matrix arrangement of solid-state light sources, intended to provide a light pattern;
  road profile acquisition means; and
  a control unit for accomplishing the steps of the method according to the first inventive aspect.

This automotive lighting device is configured to provide a Dynamic Bending Light functionality without moving parts, and using elements which are already available, but with a new configuration.

In some particular embodiments, the matrix arrangement comprises at least 2000 solid-state light sources.

This invention can be useful for many types of lighting matrix/array-based technology, from the simplest one, with only a few thousands light sources, to more advanced one, with several hundred thousand one.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIGS. 5 and 6 show the matrix of FIG. 3 corrected with some shifting values, according to some steps of a method according to the invention.

DETAILED DESCRIPTION OF THE INVENTION

Elements of the example embodiments are consistently denoted by the same reference numerals throughout the drawings and detailed description where appropriate:
  1 Light pattern
  2 LED
  3 Control center
  4 Camera
  5 Row of light pattern
  10 Lighting device
  100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

Figure 1:
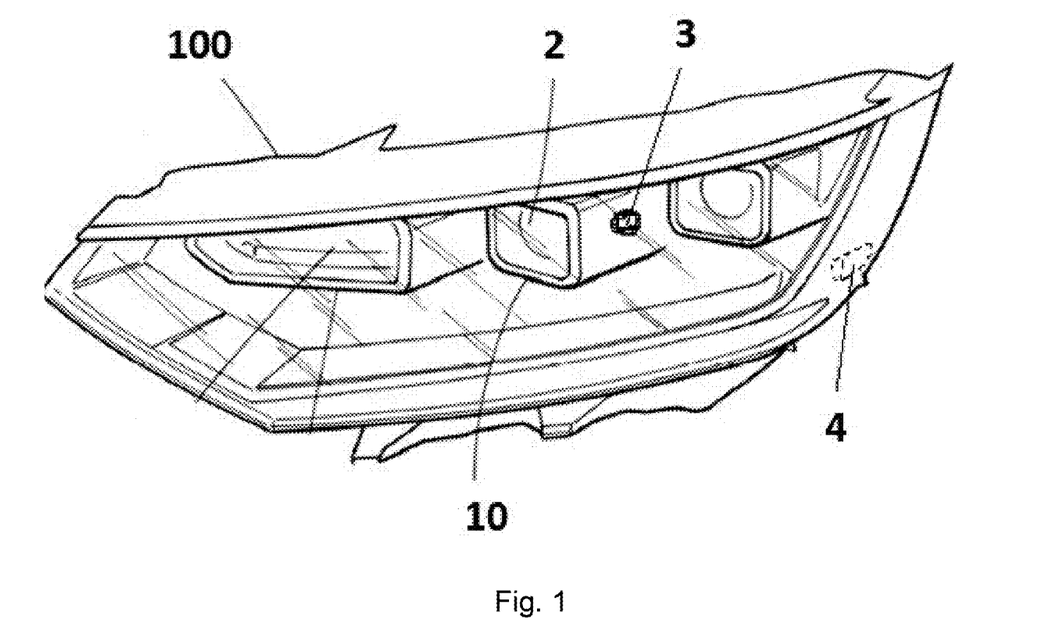
FIG. 1 shows a general perspective view of an automotive lighting device according to the invention.

FIG. 1 shows a general perspective view of an automotive lighting device 10 according to the invention.

This lighting device 10 comprises a matrix arrangement of LEDs 2 and a control center 3 which is configured to control the operation of these groups of LEDs.

This lighting device 10 comprises a camera 4 which is configured to obtain images from the road ahead. The use of these images and the information obtained from the global positioning system of the vehicle enables the control center 3 to obtain a road profile.

The control center 3 is configured to modify the configuration of the LEDs 2 when a bend is detected in the road profile.

This matrix configuration is a high-resolution module, having a resolution greater than 1000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometre.

The monolithic matrix is coupled to the control center so as to control the generation and/or the projection of a pixilated light beam by the matrix arrangement. The control center is thus able to individually control the light emission of each pixel of the matrix arrangement.

Alternatively to what has been presented above, the matrix arrangement 6 may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control center.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

Figure 2:
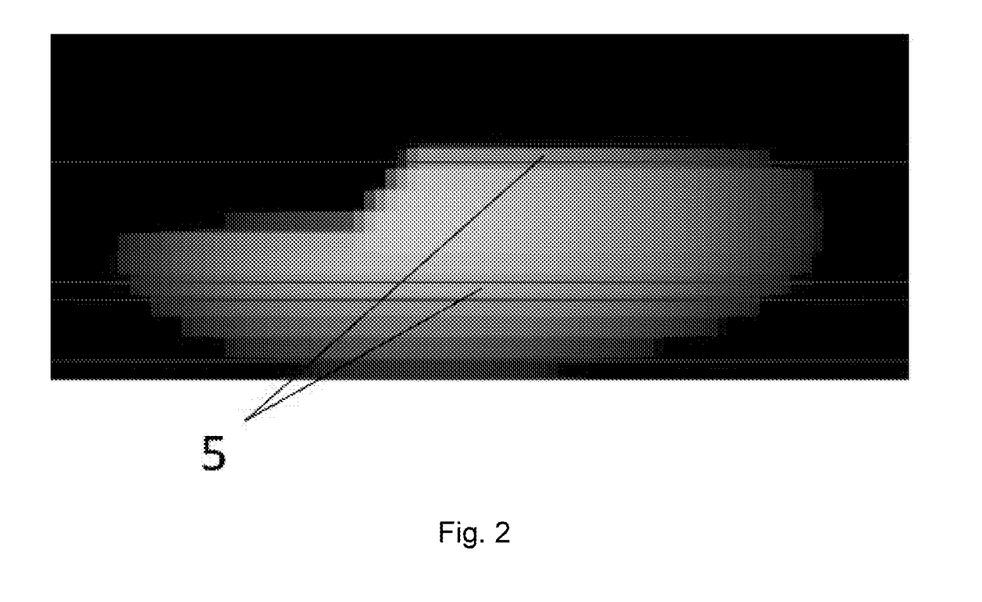
FIG. 2 shows some steps of a method according to the invention.

This figure shows a low beam light pattern 1 in an initial stage. This low beam is divided into row groups 5, each row group containing a row of pixels.

Each light pixel 3 of this image pattern 1 is characterized by a number according to a scale from 0 to 255, wherein 0 corresponds to no light and 255 corresponds to maximum luminous intensity.

Figure 3:
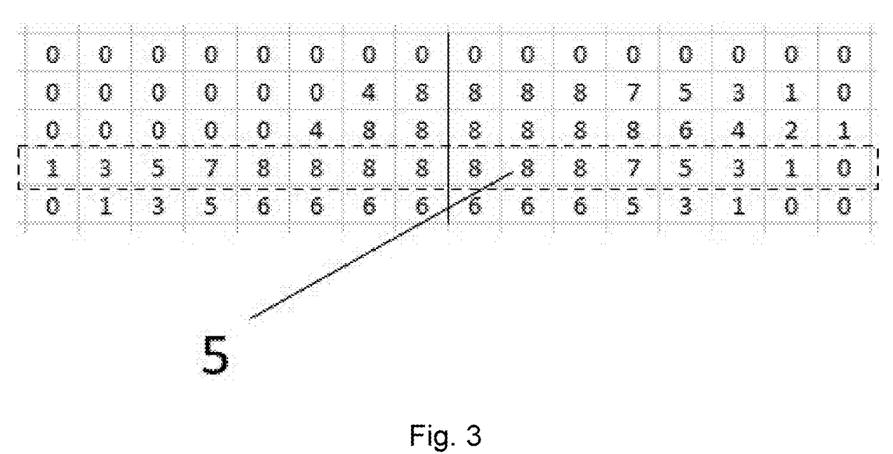
FIG. 3 shows a portion of a pixel matrix, which is the numeric correspondence to a light pattern similar to the one of FIG. 2.

FIG. 3 shows a non-representative example of luminous intensity values for such a pattern. Since the original pattern has thousands of pixels, it will not be useful to represent all of them, but only a small representation has been chosen for the sake of clarity.

Further, although the standard use will be luminous intensity values from 0 to 255, according to a standard grey scale, in this example only numbers from 0 to 9 will be used, to keep the example as simple as possible.

This light pattern is divided into two portions: a first portion 11 and a second portion 12. The first portion has a boundary column 6, which is adjacent to a first boundary column 8 of the second portion 12, and an end column 7, which is opposite to it. The second portion 12 has in turn a boundary column 8, which is adjacent to a boundary column 6 of the first portion 11, and an end column 9, which is opposite to it.

Hence, each row has a first portion (the pixels of this row belonging to the first portion 11) and a second portion (the pixels of this row belonging to the second portion 12). The first portion of each row has a boundary pixel (the pixel belonging to the boundary column 6) and an end pixel (the pixel belonging to the end column 7). The second portion of each row has a boundary pixel (the pixel belonging to the boundary column 8) and an end pixel (the pixel belonging to the end column 9).

The matrix arrangement provides the resolution in terms of distance and angle. For example, in a matrix arrangement of 100 rows and 240 columns, which is able to project light at 100 metres and cover an angle of 120°, each row covers a distance which is proportional to the height of the module and to the tangent of the vertical angle covered by the corresponding row, and each column covers an angle of 0.5° further from the preceding column.

Since this example could not cover such a great amount of pixels, for the sake of clarity, the matrix of FIG. 3 contains 5 rows and 16 columns. Although this is not completely realistic, each row will be considered to cover a constant distance of 10 m and each column will be considered to cover a constant angle of 5°. Intensity values are only comprised between 0 and 10.

Figure 4:
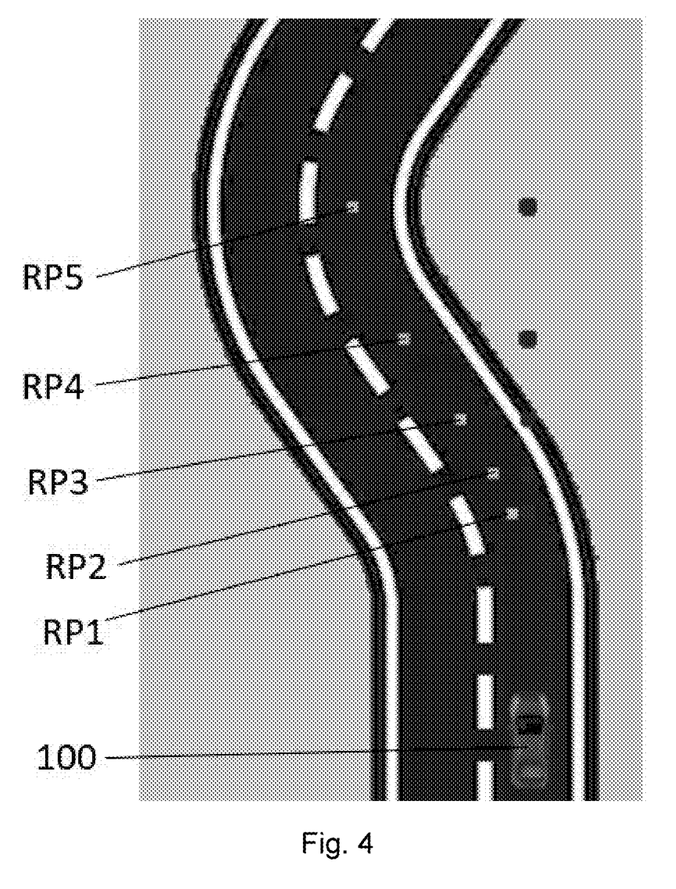
FIG. 4 shows further steps of a method according to the invention.

FIG. 4 shows further steps of the method.

In this figure, the road, as acquired from the camera and/or the GPS system, is shown. Some road points RP1, RP2, RP3, RP4, RP5 are calculated at the center point of the lane, at different distances. The distances will depend on the row groups of the matrix arrangement. To continue with the example of FIG. 3, road points are selected at 10 m, 20 m, 30 m, 40 m and 50 m.

Each road point will define a deviation angle with respect to the main direction of the lighting device. These angles may be easily calculated from the 2D distances to the lighting device. Hence, each road point is characterized by a distance and an angle.

For example, road point 1 RP1, corresponding to a distance of 10 m, has an angle of 5°; the road point 2 RP2, corresponding to a distance of 20 m, has an angle of 10°, the road point 3 RP3, corresponding to a distance of 30 m, has an angle of 20°, the road point 4 RP4, corresponding to a distance of 40 m, has an angle of 20° and the road point 5 RP5, corresponding to a distance of 50 m, has an angle of 25°.

With these values, the shifting value for row 1 would be 1 pixel, the shifting value for row 2 would be 2 pixel, the shifting value for row 3 would be 4 pixel, the shifting value for row 4 would be 4 pixel and the shifting value for row 5 would be 5 pixel.

Figure 5:
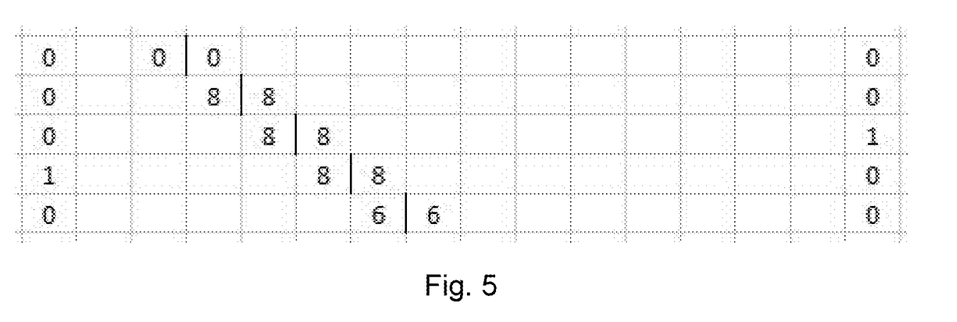
Figure 6:
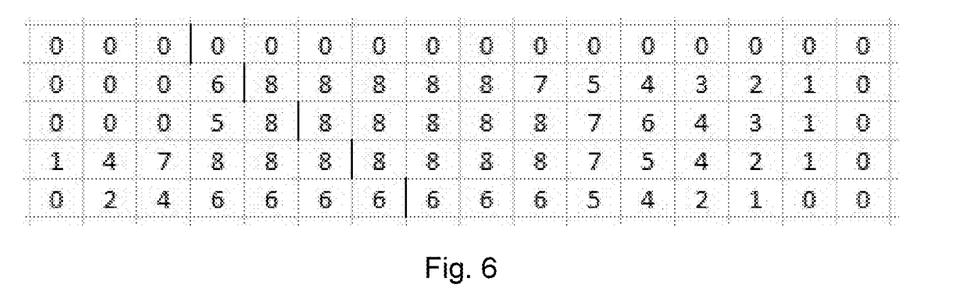
FIG. 6 shows the completed version of the light pattern of FIG. 5, with a linear interpolation between the boundary pixels of each row.

FIGS. 5 and 6 show the matrix of FIG. 3 corrected with these shifting values. Each row has been shifted to the left according to the corresponding shifting value, so that the modified light pattern is obtained.

FIG. 5 shows a first sub-step: in each row, the boundary pixels are shifted to the left, each row according to its corresponding shifting value. In the first and second portions, only the boundary columns and the end columns preserve their value.

FIG. 6 shows the interpolation of the rest of the values of the first and second portions. This is done by rows, adapting the values to the original ones, by "expanding" or "compressing" the intensity patterns following a linear interpolation.

Choosing for example the fourth row, in the original pattern, this row had the values 1-3-5-7-8-8-8-8-8-8-8-7-5-3-1-0. This row, according to the division, will have a first portion 1-3-5-7-8-8-8 and a second portion 8-8-8-7-5-3-1-0.

Since the shifting value involves two columns to the left in this fourth row, the first portion will have the following pattern: 1-x-x-x-x-8 and the second portion will be 8-x-x-x-x-x-x-x-0, as shown in FIG. 5.

The values x of the first portion will be calculated with respect to the data provided by the original first portion: at 0% the value is 1, at 14% the value is 3, at 28% the value is 5, at 42% the value is 7, at 57% the value is 8, at 71% the value is 8, at 85% the value is 8 and at 100% the value is 8.

This provides a curve, and the values at 0%, 20%, 40%, 60%, 80% and 100% will be calculated for the new width of the first portion, since this compressed first portion only contains 6 pixels, against the 8 pixels of the original first portion. Hence, the new values for this interval will be 1-4-7-8-8-8.

The same will be performed with the second portion: in the original second portion, at 0% the value is 8, at 14% the value is 8, at 28% the value is 8, at 42% the value is 7, at 57% the value is 5, at 71% the value is 3, at 85% the value is 1 and at 100% the value is 0. For the new second portion, values will be calculated at 0%, at 11%, at 22%, at 33%, at 44%, at 55%, at 66%, at 77%, at 88% and at 100%. Hence, the new values for this interval will be 8-8-8-8-7-5-4-2-1-0.

Figure 7:
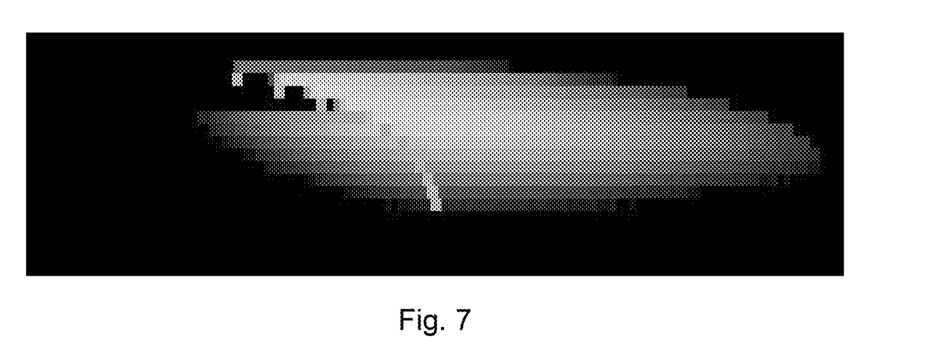
FIG. 7 shows the effect of this shifting in a more realistic light pattern.

FIG. 7 shows the effect of this shifting in a more realistic light pattern. Each row is shifted according to a different value, so the final light pattern has a better adaptation to the road than the ones provided by current methods.

However, as may be seen in this image, the upper part of the light pattern may be projecting some light on the opposite lane. To provide a remedy for this problem, the present invention provides different options.

Figure 8:
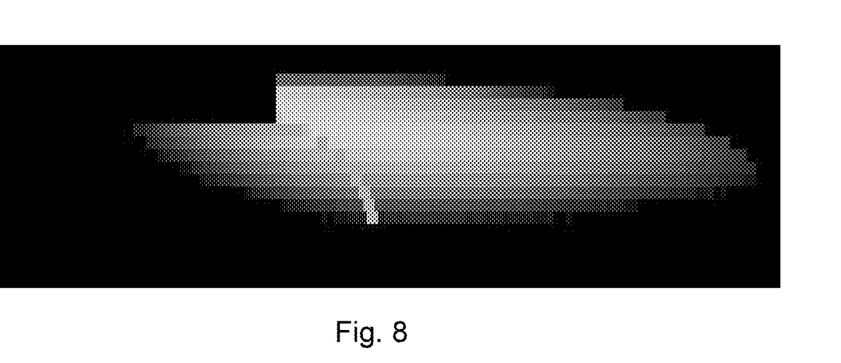
FIG. 8 shows a first variation of the light pattern of FIG. 7.

First one, shown in FIG. 8, involves the combination of the present invention with Adaptive Driving Beam functionality, so that a dark mask is applied over the portion which is to be projected over a vehicle, to avoid glaring at it. In simpler embodiments, this mask would be merely configured to avoid light projection on the opposite lane.

Figure 9:
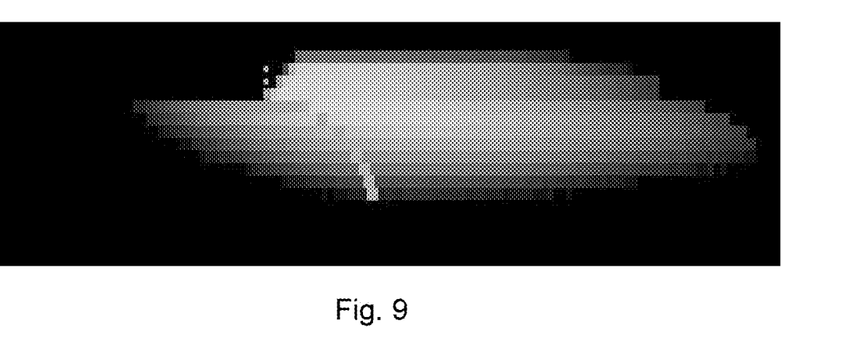
FIG. 9 shows a second variation of the light pattern of FIG. 7.

FIG. 9 illustrates a second option, where the upper part of the light pattern is considered, and therefore shifted, as a single row.

With this option, the kink shape is preserved, so that the opposite lane is not invaded by the deformed shape obtained in other embodiments of the method.

The lower part of the image would be divided into rows, as explained in the examples above, but the upper part, containing the kink of the low beam pattern, would be considered as a single row, so that the shifting values for all the rows comprised in this global row would be the same.

What is claimed is:

1. A method for controlling a light pattern provided by an automotive lighting device of an automotive vehicle, wherein the light pattern is provided by a matrix arrangement of light pixels, the method comprising:
   providing a road profile;
   extracting road features from the road profile,
   dividing the matrix arrangement in row groups;
   assigning a different shifting value for each row group, each shifting value depending on the road features;
   dividing each row group in at least a first portion and a second portion, wherein each portion includes at least a boundary pixel which is in contact with the boundary pixel of an adjacent portion;
   modifying the width of the first portion and the width of the second portion by shifting the position of the boundary pixels in each row group according to the corresponding shifting value and interpolating the luminous intensity values of the pixels belonging to the first and second portion, wherein the boundary pixels that were adjacent before the shifting remain adjacent after the shifting.

2. The method according to claim 1, wherein
   each of the first and the second portion includes an end pixel which is opposite to the corresponding boundary pixel and is not shifted during the shifting step, and
   further comprising interpolating the luminous intensity values by considering the luminous intensity values of the original width between the corresponding end pixel and the corresponding boundary pixel and interpolating new values for the new width of each portion.

3. The method according to claim 1, wherein each row group corresponds to only one row of the matrix arrangement of light pixels.

4. The method according to claim 1, further comprising applying a final mask configured to avoid glaring by dimming or turning off some of the shifted light pixels.

5. The method according to claim 1, wherein the road features are road points, with each road point being characterized by a distance from the lighting device and an angle from the lighting device, and the shifting values are calculated using the distance and angle of the road points.

6. The method according to claim 5, wherein each shifting value is calculated using the distance and angle of at least one road point.

7. The method according to claim 1, further comprising compensating the luminous intensity of some of the light pixels of the modified light pattern, thus obtaining a compensated light pattern such that the luminous flux of the compensated light pattern is equal to the luminous flux of the original light pattern.

8. The method according to claim 7, wherein compensating the luminous intensity comprises multiplying the luminous intensity of at least some of the light pixels of the modified light pattern by a compensation factor.

9. The method according to claim 8, wherein the compensation factor is a global compensation factor which is applied to all of the pixels of the modified light pattern and is calculated from the total luminous flux of the original light pattern and the total luminous flux of the modified light pattern according to the formula $$g=1+(f1-f0)/f0,$$

wherein g is the global compensation factor, f1 is the total luminous flux of the modified light pattern and f0 is the total luminous flux of the original light pattern.

10. The method according to claim 8, wherein the original light pattern is a low beam pattern including a kink zone and the compensation factor is not applied to the light pixels of the kink zone.

11. The method according to claim 8, wherein the original light pattern is a high beam pattern including a maximum luminous intensity pixel and the compensation factor is not applied to the maximum luminous intensity pixel.

12. The method according to claim 1, wherein the step of providing a road profile is carried out by using images of a camera and/or a global positioning system.

13. The method according to claim 1, wherein the light pixels of the image pattern are grey scale pixels.

14. Automotive lighting device comprising:
a matrix arrangement of solid-state light sources, intended to provide a light pattern;
road profile acquisition means; and
a control unit configured to:
provide a road profile;
extract road features from the road profile,
divide the matrix arrangement in row groups;
assign a different shifting value for each row group, each shifting value depending on the road features;
divide each row group in at least a first portion and a second portion, wherein each portion includes at least a boundary pixel which is in contact with the boundary pixel of an adjacent portion; and
modify the width of the first portion and the width of the second portion by shifting the position of the boundary pixels in each row group according to the corresponding shifting value and interpolating the luminous intensity values of the pixels belonging to the first and second portion, wherein the boundary pixels that were adjacent before the shifting remain adjacent after the shifting.

15. The method according to claim 13, wherein the luminous intensity of each gray scale pixel is according to a scale from 0 to 255.

* * * * *